(12) United States Patent
Kang et al.

(10) Patent No.: US 8,599,989 B2
(45) Date of Patent: Dec. 3, 2013

(54) MODULAR REACTOR HEAD AREA ASSEMBLY

(75) Inventors: Tae-Kyo Kang, Daejeon (KR); Hyun-Min Kim, Daejeon (KR); Young-Ju Kwon, Daejeon (KR); Kwang-Hee Cho, Daejeon (KR); Ki-Seok Yoon, Daejeon (KR); In-Yong Kim, Daejeon (KR); Yeon-Ho Cho, Daejeon (KR); Myoung-Goo Lee, Daejeon (KR)

(73) Assignee: Korea Power Engineering Company, Inc., Yongin (KR)

( * ) Notice: Subject to any disclaimer, the term of this patent is extended or adjusted under 35 U.S.C. 154(b) by 689 days.

(21) Appl. No.: 12/521,911

(22) PCT Filed: Dec. 31, 2007

(86) PCT No.: PCT/KR2007/007022
§ 371 (c)(1),
(2), (4) Date: Jul. 1, 2009

(87) PCT Pub. No.: WO2008/082235
PCT Pub. Date: Jul. 10, 2008

(65) Prior Publication Data
US 2010/0098205 A1    Apr. 22, 2010

(30) Foreign Application Priority Data
Jul. 2, 2007   (KR) ........................ 10-2007-0000290

(51) Int. Cl.
*G21C 9/00* (2006.01)
*G21C 1/01* (2006.01)
*G21C 1/00* (2006.01)

(52) U.S. Cl.
USPC ........... 376/263; 376/260; 376/261; 376/262; 376/277

(58) Field of Classification Search
USPC ......... 376/263, 260, 261, 287, 262, 277, 285, 376/298, 409, 426, 434, 438, 442; 976/DIG. 139, DIG. 151
See application file for complete search history.

(56) References Cited

U.S. PATENT DOCUMENTS 4,059,483 A * 11/1977 Anthony ........................ 376/442
4,678,623 A *  7/1987 Malandra et al. ............. 376/260
(Continued)

FOREIGN PATENT DOCUMENTS

| | | |
|---|---|---|
| JP | 01-097898 | 4/1989 |
| JP | 2-94104   | 7/1990 |

(Continued)

OTHER PUBLICATIONS

International Search Report for PCT/KR2007/007022 mailed Apr. 11, 2008.
(Continued)

*Primary Examiner* — Bernarr Gregory
(74) *Attorney, Agent, or Firm* — Nixon & Vanderhye, PC (57) ABSTRACT

Provided is a modular reactor head area assembly. The modular reactor head area assembly is installed on a reactor head, and includes: a seismic support structure that performs functions of lifting, moving and reinstallation of the reactor head and control rod driving apparatuses, cooling of the control rod driving apparatuses, shielding of missile parts, and supporting with respect to a seismic load, and disperses a load applied to the control rod driving apparatuses; an upper module that is an assembly of components located at an upper portion of the seismic support structure for the control rod driving apparatuses; and a lower module that is an assembly of components located at a lower portion of the seismic support structure for the control rod driving apparatuses. The upper module and the lower module are 252 detachably coupled to each other so that maintenance of the control rod driving apparatus can be performed easily.

6 Claims, 10 Drawing Sheets

(56) References Cited

U.S. PATENT DOCUMENTS

| | | | | |
|---|---|---|---|---|
| 4,752,436 | A | * | 6/1988 | Snyder .................... 376/285 |
| 4,828,789 | A | | 5/1989 | Hankinson et al. |
| 5,740,216 | A | * | 4/1998 | Morishita ................ 376/285 |
| 5,742,652 | A | * | 4/1998 | Hankinson et al. .......... 376/298 |
| 5,930,321 | A | * | 7/1999 | Harkness et al. ........... 376/298 |
| 6,546,066 | B2 | * | 4/2003 | Baliga et al. ............. 376/263 |
| 6,618,460 | B2 | * | 9/2003 | Baliga et al. ............. 376/261 |
| 6,639,960 | B2 | * | 10/2003 | Harkness et al. ........... 376/260 |
| 7,139,359 | B2 | * | 11/2006 | Baliga et al. ............. 376/287 |
| 7,158,605 | B2 | * | 1/2007 | Harkness et al. ........... 376/263 |
| 7,567,645 | B2 | * | 7/2009 | Baliga .................... 376/263 |
| 2005/0084057 | A1 | | 4/2005 | Harkness et al. |
| 2006/0034414 | A1 | | 2/2006 | Baliga et al. |
| 2007/0140402 | A1 | * | 6/2007 | Baliga .................... 376/203 |

FOREIGN PATENT DOCUMENTS

| | | |
|---|---|---|
| JP | 10-073689 | 3/1998 |
| JP | 2005-099013 | 4/2005 |
| KR | 10-2000-0074957 | 12/2000 |
| KR | 2000-0074957 A | 12/2000 |
| KR | 20000074957 | 12/2000 |

OTHER PUBLICATIONS

Written Opinion for PCT/KR2007/007022 mailed Apr. 11, 2008.
The above patents are references cited in an Office Action dated Sep. 6, 2011 of Japanese Patent Application No. 2009-544787.
Extended Search Report dated Jul. 17, 2012 of the European Patent Application No. 07860799.1, which corresponds to U.S. Appl. No. 12/521,911.

* cited by examiner

MODULAR REACTOR HEAD AREA ASSEMBLY

This application is the U.S. national phase of International Application No. PCT/KR2007/007022, filed 31 Dec. 2007, which designated the U.S. and claims priority to Korean Application No(s). 10-2007-0000290, filed 2 Jan. 2007, the entire contents of each of which are hereby incorporated by reference.

TECHNICAL FIELD

The present invention relates to a modular reactor head area assembly, and more particularly, to a modular reactor head area assembly that can be removed and assembled easily so that maintenance of control rod driving apparatuses installed on the reactor can be performed in a simple way.

BACKGROUND ART

A reactor head area assembly is a structure installed on a pressurized water reactor (PWR) head. When a reactor operates normally, the reactor head area assembly performs functions such as cooling of control rod driving apparatuses, forming of a cooling air path, shielding of missile parts, and supporting of the structure with respect to seismic loads. In addition, when refueling is performed, the reactor head area assembly lifts the control rod driving apparatuses and the reactor head at the same time.

As described above, since the reactor head area assembly lifts the control rod driving apparatus and the reactor head when the refueling is performed, research into integrating the reactor head area assembly has been performed in order to reduce the number of structures that should be removed or assembled when a refueling process is performed. Korean Laid-open Patent No. 2000-74957 discloses an integrated head area design of a nuclear reactor.

Figure 1:
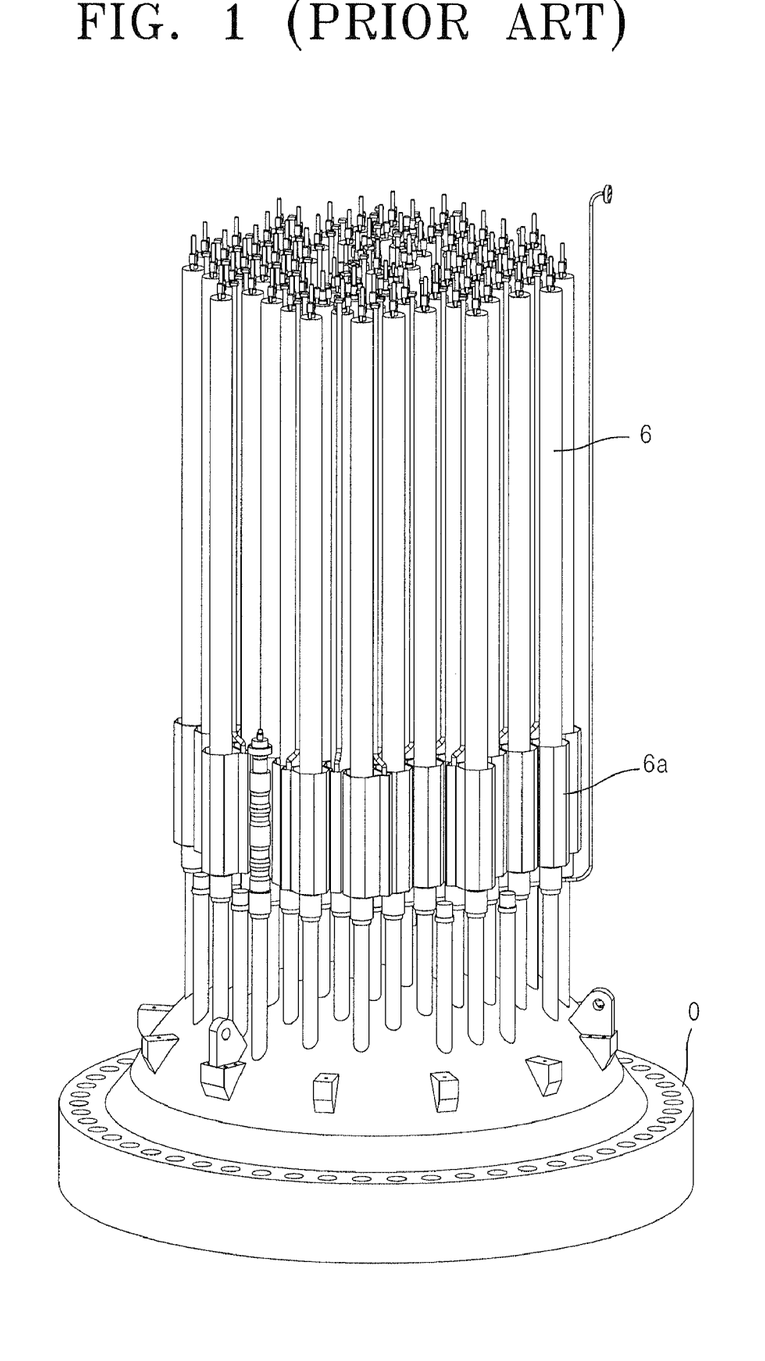
FIG. 1 is a view of a control rod driving apparatus.

Referring to FIG. 1, a control rod driving apparatus 6 in a reactor head area assembly is a structure installed on a reactor head 0 in order to insert and withdraw control rods that controls a nuclear reaction speed in a core of the reactor. The control rod driving apparatus 6 is formed in a general tube shape having gaps therein. The control rod moves in an up-and-down direction by the driving shaft in the control rod driving apparatus 6 to control the nuclear reaction speed of the reactor core. A control rod position indicator is a sensor installed on the control rod driving apparatus 6 to sense a position of the control rod. A motor assembly 6a is a structure for driving the control rod.

Operations relating to the control rod driving apparatus 6 are, for example, maintenance of the motor assembly 6a, maintenance of the position director, and a calibration in initial installation of the position director or in re-installation of the position indicator.

Figure 2:
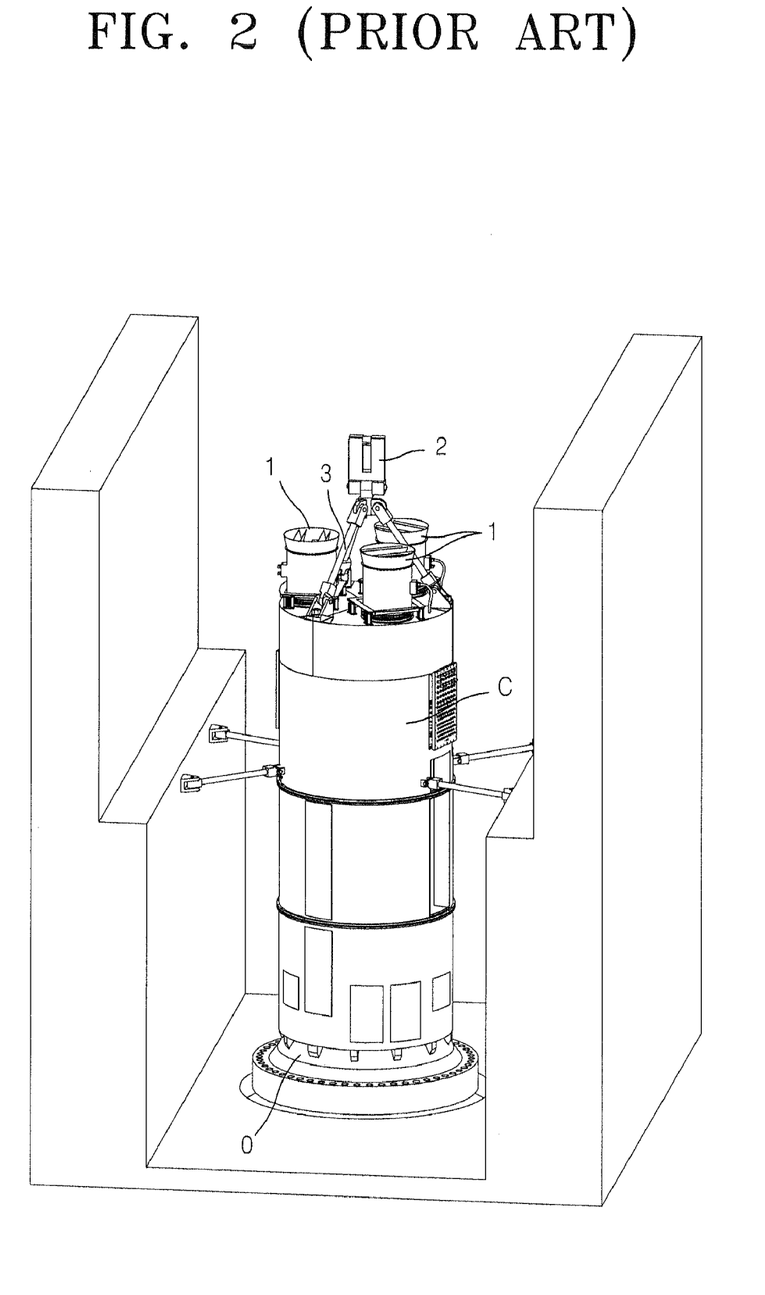
FIG. 2 is a view of a reactor head area assembly according to the conventional art.

FIG. 2 shows an example of a reactor head area assembly according to the conventional art.

The conventional reactor head area assembly includes an upper plenum including cooling fans 1, a shackle 2, and a tripod 3, and a ring type structure that is referred to as a shroud under the upper plenum. In addition, a cable support assembly, a control rod driving apparatus, and a baffle that will be described later are disposed in the shroud.

The cooling fan 1 is installed to cool the control rod driving apparatus, and the shackle 2 and the tripod 3 are used to lift the reactor head area assembly. The shackle 2 is connected to a crane (not shown), and the shackle is also connected to the tripod 3, and thus, the entire reactor head area assembly is lifted when a lifting force is applied upward by the crane.

Figure 3:
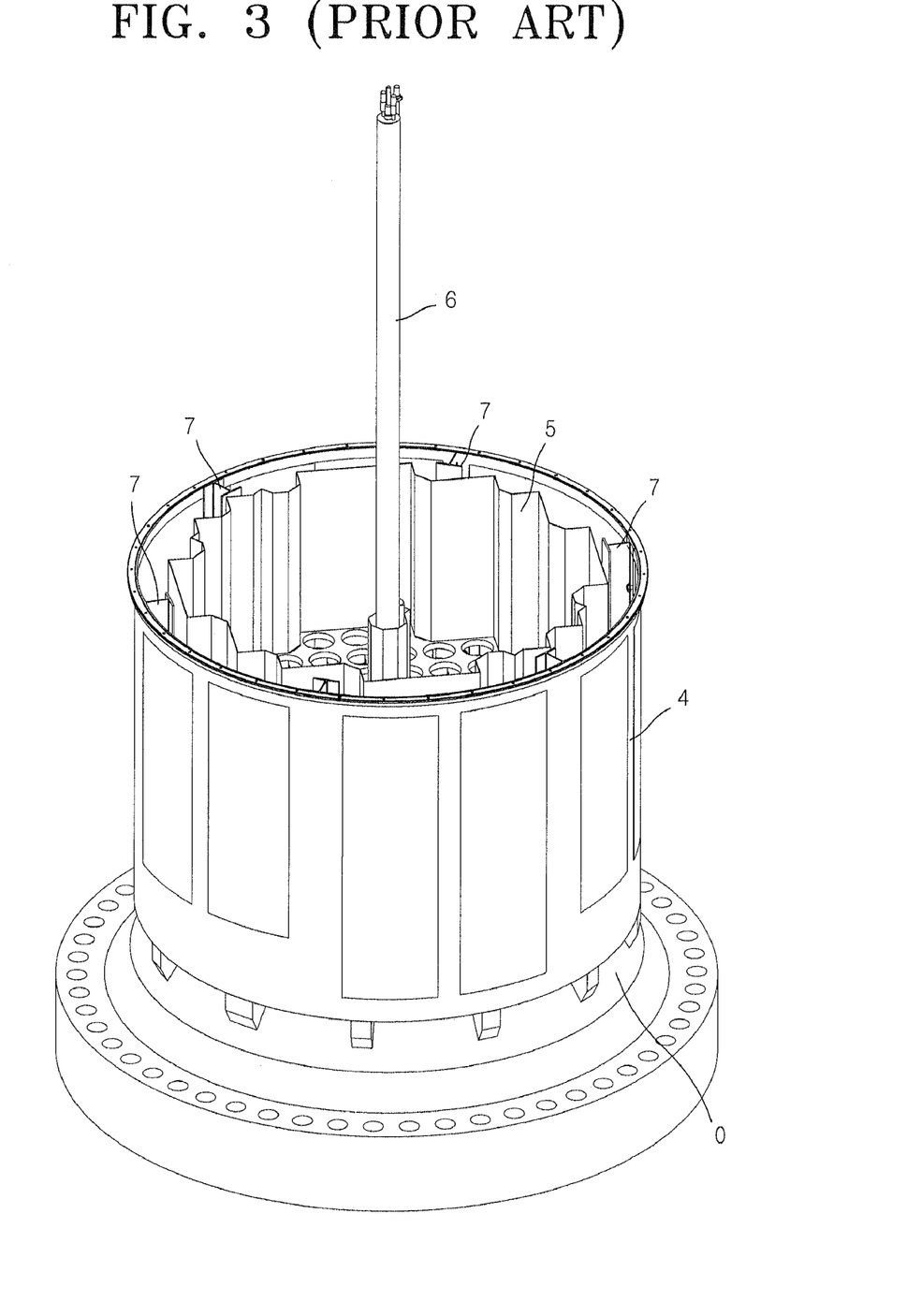
FIG. 3 is a view of an internal structure of the reactor head area assembly of FIG. 2.

FIG. 3 is a view illustrating the arrangement of the shroud 4, the baffle 5, and the control rod driving apparatus 6. The portion shown in FIG. 3 is the lowest portion of the reactor head area assembly of FIG. 2. As shown in FIG. 3, a structure, that is, the baffle 5, surrounds the control rod driving apparatus 6, and the shroud 4 surrounds the baffle 5. In FIG. 3, one control rod driving apparatus 6 is disposed in order to clarify the baffle 5 and the shroud 4, however, in actuality a plurality of control rod driving apparatuses 6 are disposed as shown in FIG. 1.

The shroud 4 performs as a cover of the structures therein, and the baffle 5 forms a flow path of air between the shroud 4 and the baffle 5 so that the air drawn by the cooling fan 1 can sufficiently flow therethrough. Therefore, the control rod driving apparatus 6 and the reactor head nozzles can be cooled down easily.

Meanwhile, the shroud 4 is supported by support columns 7 disposed on upper and lower portions of the shroud 4.

The support column 7 is not formed of an H beam that is disposed in a vertical direction, but formed of a plurality of H beams on upper and lower portions of the shroud 4, which are connected to each other. In addition, the shroud 4 is not a shell, but is formed of a plurality of plates. One reactor head area assembly includes three through five layers of shrouds 4, and the number of shroud layers is equal to the number of H beams forming one support column 7. In the reactor head area assembly of FIG. 2, four shroud layers are formed.

Figure 4:
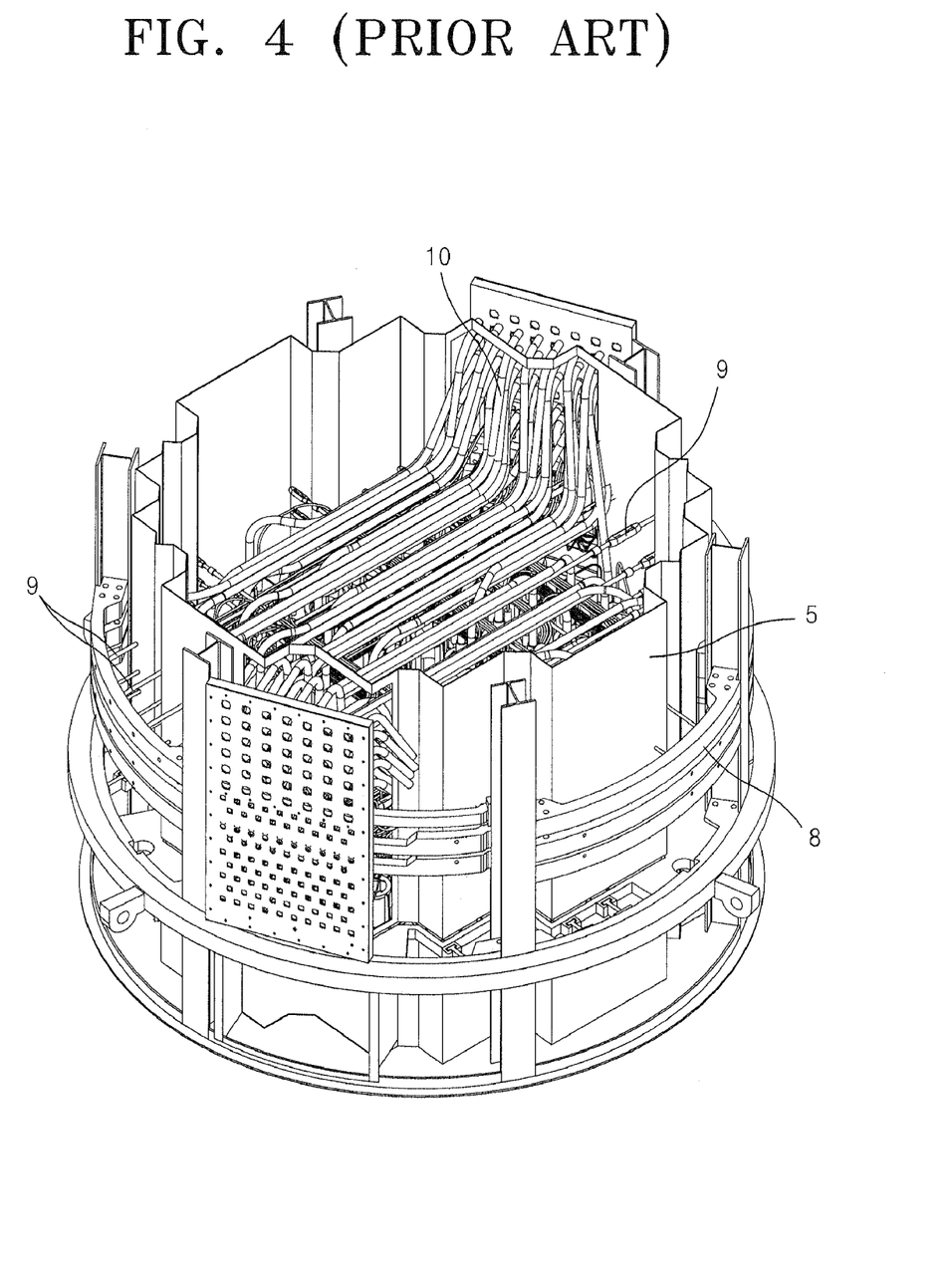

The cable support assembly supports cables 10 (shown on FIG. 4) that are connected to the control rod driving apparatus 6 to supply electricity to the control rod driving apparatus 6, or connects signals generated from the position director (not shown) located in the control rod driving apparatus 6 to be output. The cable support assembly is disposed on an upper portion of the control rod driving apparatus 6, and is located on a part denoted as C in FIG. 2. FIG. 4 illustrates a state where the cables 10 are supported by the cable support assembly.

As shown in FIG. 4, the cable support assembly includes a cable support ring beam 8 and a plurality of cable support wires 9. The cable support wires 9 include multiple layers that form grids, and thus, the cable support wires 9 can support the cables 10 with predetermined distances between the cables 10. Meanwhile, both end portions of the cable support wire 9 are fixed on the cable support ring beam 8, and the cable support wires 9 support the cables 10 by penetrating the baffle 5.

DISCLOSURE OF INVENTION

Technical Problem

In the conventional reactor head area assembly, when operations relating to the control rod driving apparatus 6 are performed, the cooling fan 1, the shackle 2, the tripod 3, and the plenum are lifted first, and then, the cable support structure, including the cable support wires 9 installed under the plenum, is disassembled to remove the cables 10 and the cable support structure. After that, the baffle 5 is separated.

As described above, it takes a long time to perform the operations of independently disassembling the elements of the reactor head area assembly, and some elements can be deformed during this process. In addition, if the deformation occurs during the disassembling process, it is difficult to re-assemble the elements due to the deformation after the operations are completed.

Meanwhile, it also takes a long time to disassemble or remove the structure located on the control rod driving apparatus, and thus, some of the elements only were disassembled to perform the operations. At this time, it is difficult to ensure a sufficient operating space.

Technical Solution

The present invention provides a modular reactor head area assembly, structures of which can be disassembled simply so that operations relating to control rod driving apparatuses can be performed easily.

According to an aspect of the present invention, there is provided a modular reactor head area assembly installed on a reactor head, the modular reactor head area assembly: a seismic support structure that supports with respect to a seismic load and disperses a load applied to control rod driving apparatuses; an upper module that is an assembly of components located at an upper portion of the seismic support structure for the control rod driving apparatuses; and a lower module that is an assembly of components located at a lower portion of the seismic support structure, wherein the upper module and the lower module are detachably coupled to each other so that maintenance of the control rod driving apparatus can be performed easily.

The upper module may include: an upper shroud shell formed as a cylinder with open upper and lower ends; an upper baffle fixed in the upper shroud shell to be supported by the shroud shell, and forming an air path for cooling down the control rod driving apparatuses; a cooling fan for cooling the control rod driving apparatuses, a shackle connected to a crane for lifting force, a tripod connected to the shackle, and a plenum that supports the cooling fan, the shackle, and the tripod, and is coupled to an upper portion of the upper shroud shell; cables connected to the control rod driving apparatuses to supply an electricity, and transferring signals generated from a measurer installed in the reactor; and a cable support assembly including a cable support ring beam fixed on the upper shroud shell, and cable support wires, both end portions of which are fixed on the cable support ring beam to support the cables.

The lower module may include: a lower shroud shell formed as a cylinder with open upper and lower ends; a lower baffle fixed in the lower shroud shell to be supported by the lower shroud shell; a plurality of control rod driving apparatuses disposed in the lower shroud shell for lifting or inserting a control rod of the reactor; and a seismic cap plate, a seismic support board, and a seismic support ring beam for the control rod driving apparatuses, which are formed on an upper portion of the lower shroud shell to transfer a load applied to the control rod driving apparatuses to an external structure.

The upper shroud shell and the upper baffle may be detachably fixed on the seismic support ring beam.

flanges may be formed on each of lower end portions of the upper shroud shell and the upper baffle is supported by the upper shroud shell , and the flanges formed on the upper shroud shell is coupled to the seismic support ring beam using bolts so that the upper module including the upper shroud and the upper baffle can be separated from the lower module by removing the bolts.

The cable support ring beam may be fixed on an outer portion of the upper shroud shell, and the cable support wires penetrate the upper shroud shell and the upper baffle to support the cables.

Advantageous Effects

According to the present invention, the modular reactor head area assembly including a plurality of stacked modules is provided so that some parts of the reactor head area assembly can be removed or installed simultaneously. According to the present invention, the components of the reactor head area assembly can be removed using a simple disassembling process, and thus, the operator can easily perform maintenance of the control rod driving apparatuses that are located in the reactor head area assembly, and the moving and handling of the modular reactor head area assembly can be performed easily during the initial installation of the reactor head area assembly.

In addition, the modular reactor head area assembly is provided, and thus, the reactor head area assembly can be fabricated easily. Also, since the operations performed at the fabrication field can be minimized, the unity of the structure can be improved.

DESCRIPTION OF DRAWINGS

The above and other features and advantages of the present invention will become more apparent by describing in detail exemplary embodiments thereof with reference to the attached drawings in which:

FIG. 4 is a view of a cable support assembly in the reactor head area assembly of

FIG. 2;

BEST MODE

Hereinafter, a modular reactor head area assembly of the present invention will be described as follows with respect to accompanying drawings.

Figure 5:
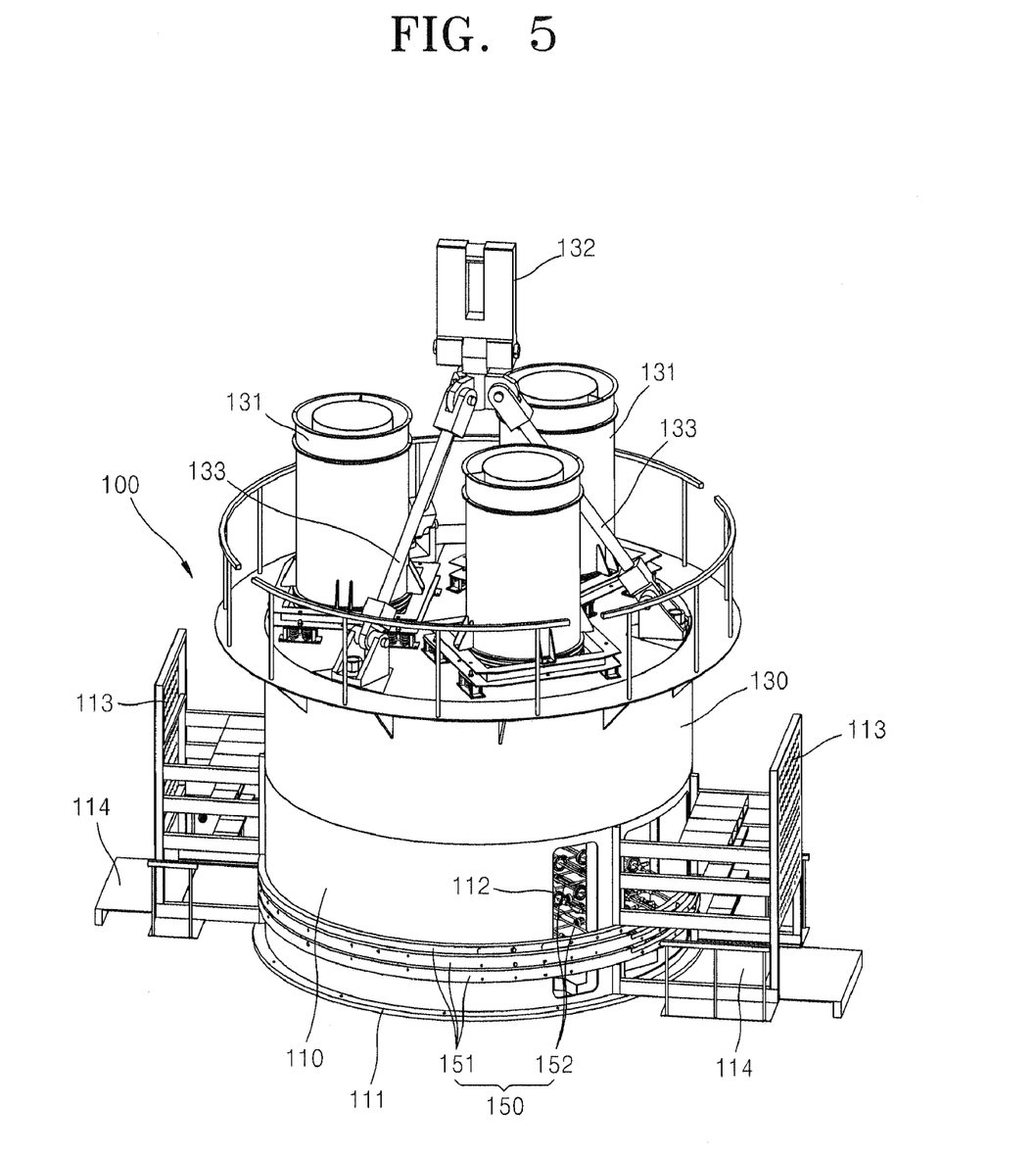
FIG. 5 is a perspective view of an upper module in a modular reactor head area assembly according to an embodiment of the present invention.
Figure 6:
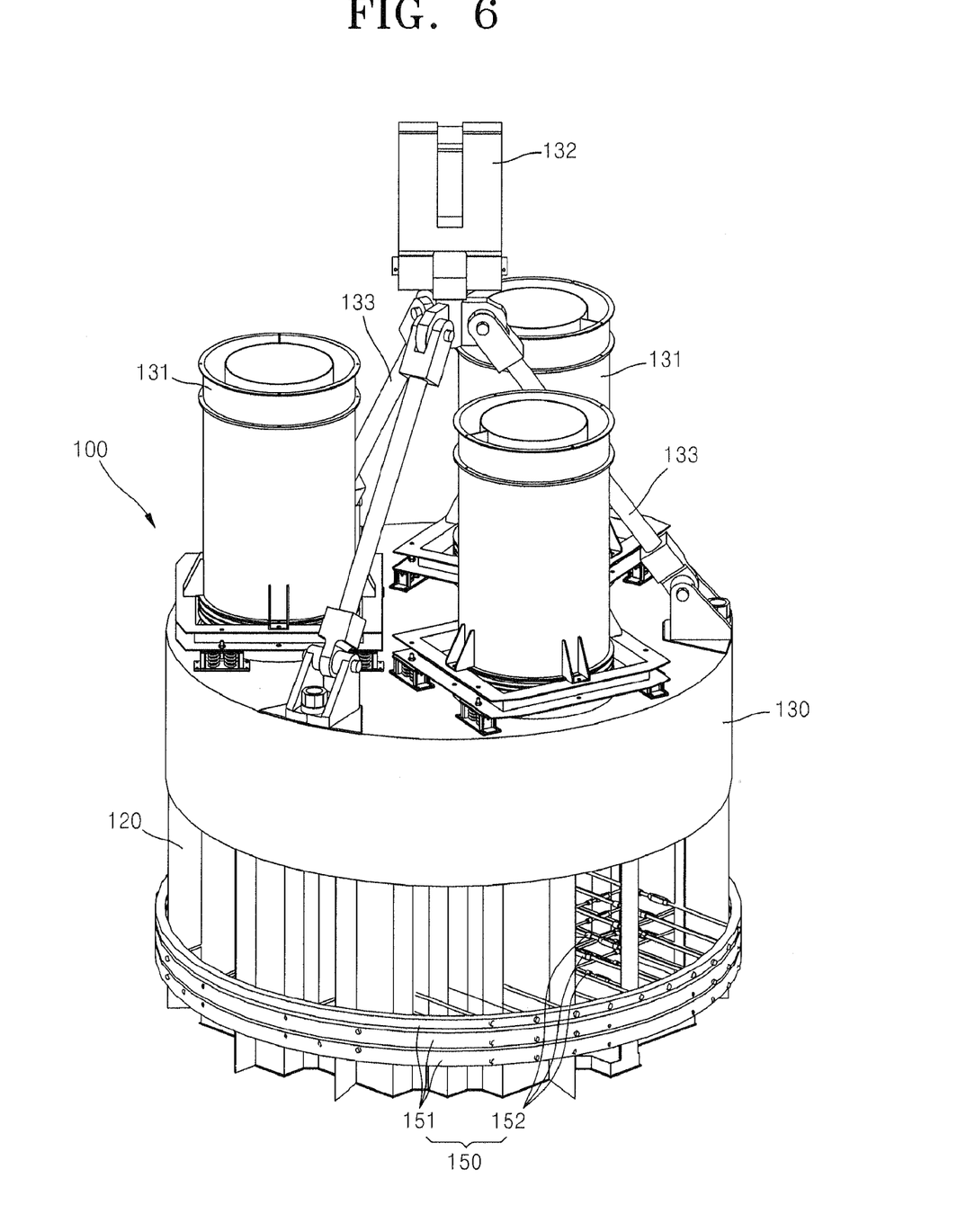
FIG. 6 is a perspective view of the upper module of FIG. 5, in which an upper shroud shell is removed.
Figure 7:
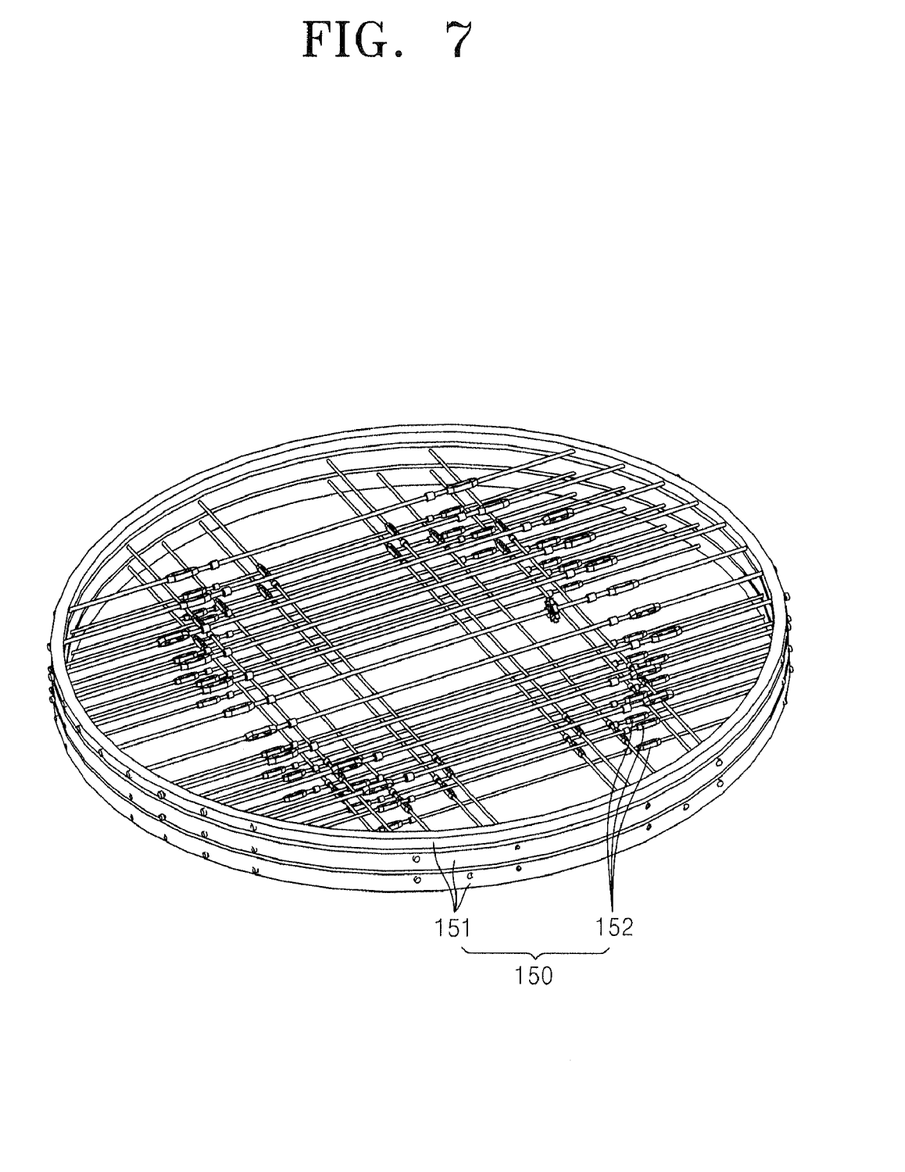
FIG. 7 is a perspective view of a cable support assembly included in the upper module of FIG. 5.
Figure 8:
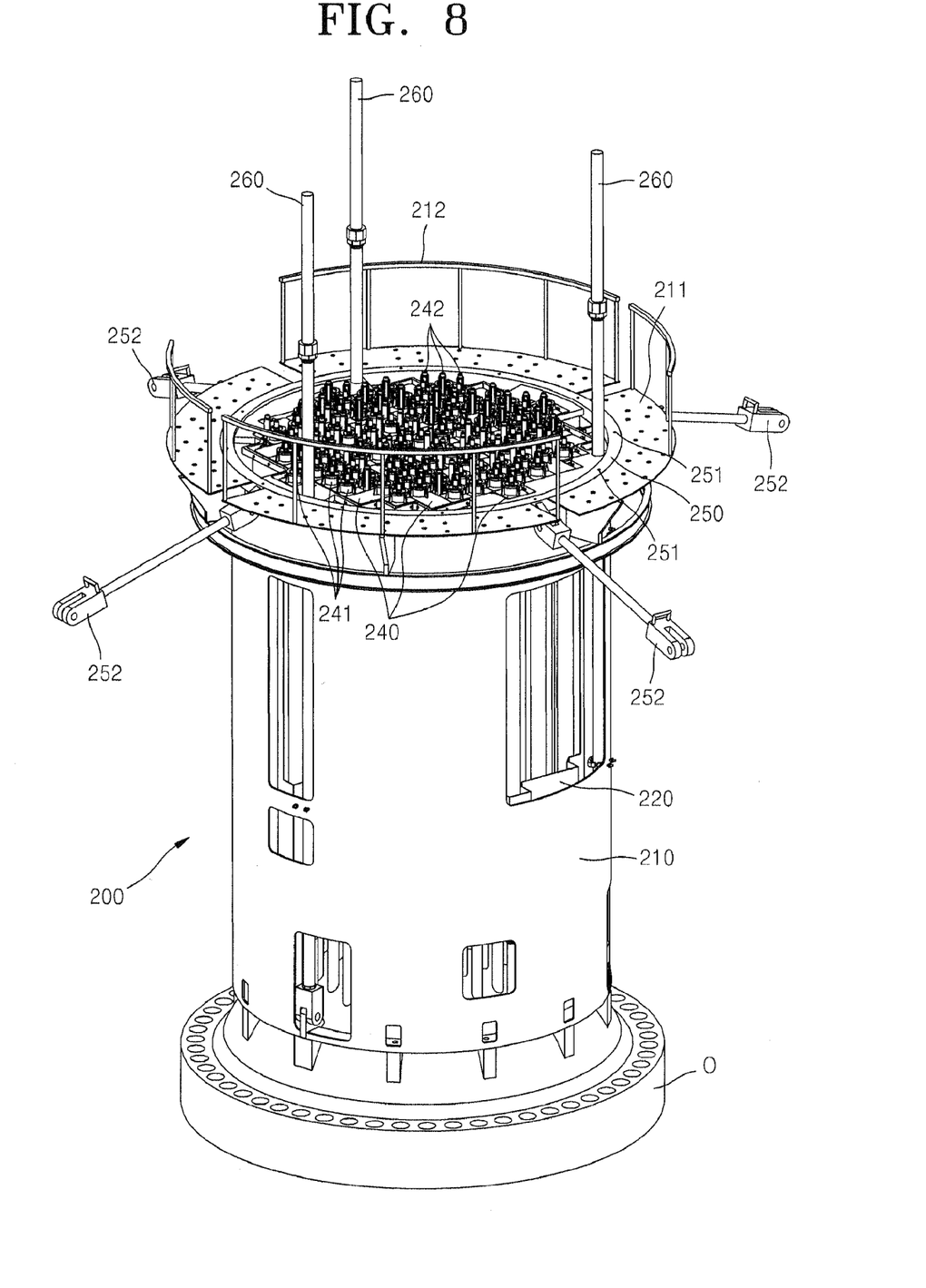
FIG. 8 is a perspective view of a lower module in the modular reactor head area assembly according to the embodiment of the present invention.
Figure 9:
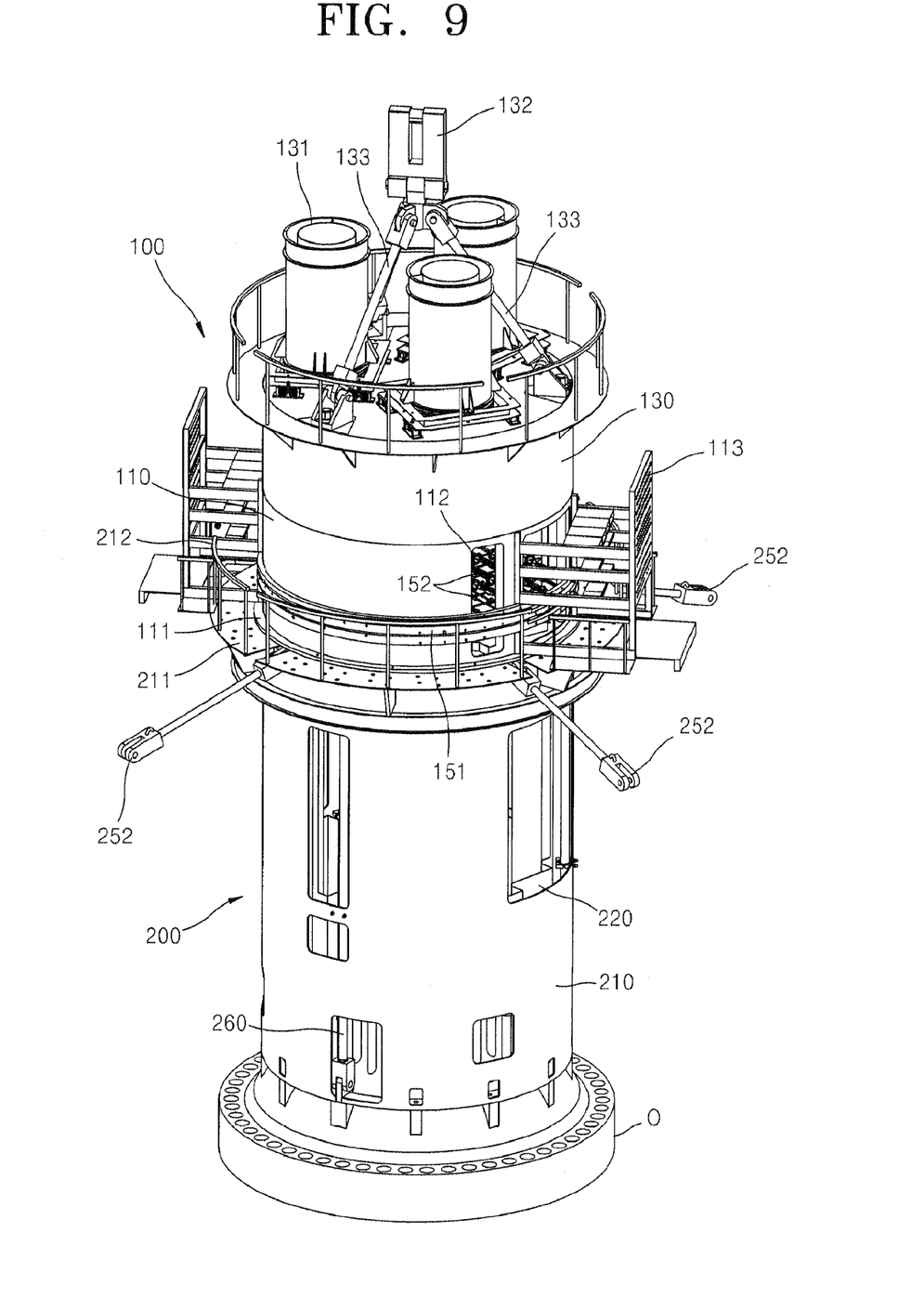
FIG. 9 is a perspective view of the upper module of FIG. 5 and the lower module of FIG. 8 that are coupled to each other.
Figure 10:
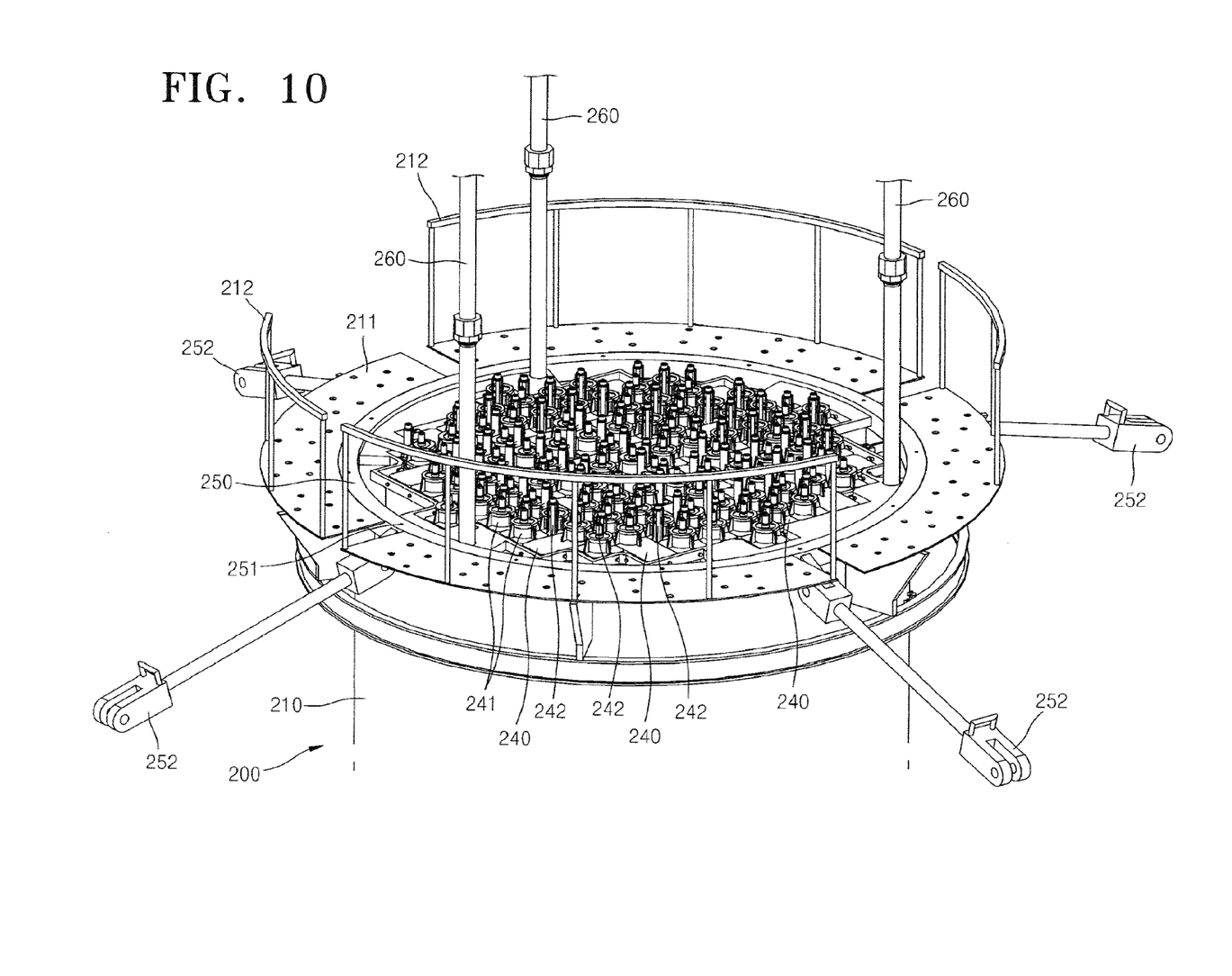
FIG. 10 is a perspective view of a seismic plate for a control rod driving apparatus in the lower module of FIG. 8.

FIG. 5 is a perspective view of an upper module in a modular reactor head area assembly according to an embodiment of the present invention, FIG. 6 is a perspective view of the upper module of FIG. 5, in which an upper shroud shell is removed, and FIG. 7 is a perspective view of a cable support assembly included in the upper module of FIG. 5. FIG. 8 is a perspective view of a lower module in the modular reactor head area assembly according to an embodiment of the present invention, FIG. 9 is a perspective view of the upper module of FIG. 5 and the lower module of FIG. 8 when coupled to each other, and FIG. 10 is a perspective view of a seismic plate for a control rod driving apparatus in the lower module of FIG. 8.

The modular reactor head area assembly according to the current embodiment includes an upper module and a lower module.

A reactor head area assembly is installed on a reactor head (0, refer to FIG. 1). The reactor head area assembly performs such functions as lifting and assembling of all the head area structures; cooling of the control rod driving apparatus, and shielding of missile parts, and additionally, supporting the control rod driving apparatus with respect to a seismic load.

A seismic support structure for distributing a load applied to the reactor head area assembly is disposed in the reactor head area assembly. The seismic support structure includes seismic cap plates 240 (FIG. 8) and a seismic support ring beam 250.

The seismic cap plates 240 for the control rod driving apparatus include seismic caps 241, and cable connection terminals 242 for connecting cables. An electric source cable that supplies electricity to the control rod driving apparatus and a cable of a position director (not shown) for sensing a position of the control rod are connected to the cable connection terminal 242. The position director is a sensor that is vertically installed in the control rod driving apparatus from an intermediate portion to an upper end portion of the control rod driving apparatus.

As described above, operations relating to the control rod driving apparatus are maintenance of a motor assembly, maintenance of the position director, and calibration in initial-installation or re-installation of the position director. In order to perform the above operations effectively, an operator needs to operate in a state where a sufficient operating space is ensured on the seismic cap plates 240, and accordingly, it is important to remove the structures on the seismic support structure for the control rod driving apparatus.

Due to the above needs, the modular reactor head area assembly of the current embodiment includes an upper module 100 that is an assembly of components located on an upper portion of the seismic support structure for the control rod driving apparatus, and a lower module 200 that is an assembly of components located on a lower portion of the seismic support structure for the control rod driving apparatus.

Hereinafter, the upper module 100 will be described in detail with reference to FIGS. 5 through 7.

Referring to FIGS. 5 and 6, the upper module 100 includes an upper shroud shell 110, an upper baffle 120, a plenum 130, and cables and a cable support assembly 150.

The upper shroud shell 110 is a cylindrical structure with open upper and lower portions, and can be formed as a shell. The upper shroud shell 110 performs as a cover surrounding the outermost portion of the reactor head area assembly, and supports the entire structure of the upper baffle 120, the plenum 130, and the cables and cable support assembly 150.

A flange 111 protruding outwards from a circumference of the upper shroud shell 110 is formed on a lower end portion of the upper shroud shell 110, and openings are formed on the flange 111 with predetermined distances therebetween.

A door 112 is formed on a part of the upper shroud shell 110 so that the operation of separating the cables from the cable connection terminal 242 can be performed in the reactor head area assembly through the door 112. In addition, the cables in the upper module 100 can be externally connected through the door 112. A cable bridge 114 with cable connection plate 113 is installed on an external side of the door 112 formed on the upper shroud shell 110 so as to be connected to the cables. The cable bridge 114 provides the routing path of the cables from IHA inside to outside and it allows to access for the cable connectors on the cable connection plate 113 from operating floor.

The upper baffle 120 is shown in FIG. 6, and FIG. 6 shows that the upper module of FIG. 5 when the upper shroud shell 110 is removed.

The upper baffle 120 is a thin plate type structure having a polygonal shape surrounding the control rod driving apparatus, and is fixedly supported by the inner side of the upper shroud shell 110.

Air that has been warmed due to the cooling of the control rod driving apparatus is guided towards the cooling fan through the space between the upper shroud shell 110 and the upper baffle 120, and accordingly, the upper baffle 120 forms an air path for cooling down the control rod driving apparatus.

A flange is formed on the lower end portion of the upper baffle 120 like in the upper shroud shell 110, however, the flange of the upper baffle 120 protrudes inwards from the lower end portion of the upper baffle 120.

The plenum 130 is a structure supporting a cooling fan 131, a shackle 132, and a tripod 133, and is installed on the upper shroud shell 110. The plenum 130 provides a space, in which air rising through the spaces between the upper shroud shell 110 and the upper baffles 120 is mixed altogether before being induced into an inlet of the cooling fan 131.

The cooling fan 131, the shackle 132, and the tripod 133 of the current embodiment are substantially the same as those of the conventional art, and thus, detailed descriptions for those are omitted here.

The conventional cables are illustrated in FIG. 4, and the cables of the current embodiment are connected to the control rod driving apparatuses via the cable connection terminals 242 formed on the seismic cap plates 240. The cables can include the cables for supplying electricity to the control rod driving apparatuses, and the cables transmitting signals generated from the position director in the reactor to an external portion of the reactor head area assembly through the door 112 and the cable connection plate 113 on the cable bridge 114.

The cable support assembly 150 includes cable support ring beams 151 and cable support wires 152. The cable support assembly 150 is shown in FIGS. 5 and 7, and FIG. 7 illustrates the cable support assembly 150 only.

The cable support ring beams 151 are fixed on the outer portion of the upper shroud shell 110 as shown in FIG. 5.

Both ends of each of the cable support wires 152 are fixed on the cable support ring beam 151, and the cable support wires 152 substantially support the cables. Referring to FIG. 7, the cable support wires 152 are arranged to form grids, and are also arranged in multiple layers. One end of the cable support wire 152 is fixed on the cable support ring beam 151 and penetrates the upper shroud shell 110 and the upper baffle 120 to support the cables, and the other end of the cable support wire 152 first penetrates the upper baffle 120 and then the upper shroud shell 110 and is fixed on the other side of the cable support ring beam 151.

Hereinafter, the lower module 200 will be described in detail with reference to FIGS. 8 and 10.

The lower module 200 includes a lower shroud shell 210, a lower baffle 220, control rod driving apparatuses, the seismic cap plates 240, seismic boards 252, a seismic support ring beam 250, and main columns 260.

The lower shroud shell 210 is a cylindrical shell with opened upper and lower portions like the upper shroud shell 110, and a flange (not shown) is formed on a lower end portion of the lower shroud shell 210 so that the lower shroud shell 210 can be coupled to the upper portion of the reactor head 0. Furthermore, the lower shroud shell 210 includes a window, through which cooling air is induced, and a lower door, through which an operator can access the reactor head to perform maintenance.

On the upper portion of the lower shroud shell 210, an operating board 211 and a handrail 212 allowing the operator to perform maintenance are formed.

The lower baffle 220 is fixed in the lower shroud shell 210 and is supported by the lower shroud shell 210. The structure, functions, and connections to the lower shroud shell 210 of the lower baffle 220 are similar to the structure, functions, and connections to the upper shroud shell 110 of the upper baffle 120, and thus, detailed descriptions of those are omitted.

A plurality of control rod driving apparatuses are installed in the lower baffle 220. Although the control rod driving apparatuses are not shown in FIG. 8 due to the lower baffle 220, they have already been described in the description of the conventional art with reference to FIGS. 1 through 4, and thus, detailed descriptions of the control rod driving apparatuses are omitted.

The seismic cap plates 240 are installed on upper portions of the control rod driving apparatuses, and include the seismic caps 241 for protecting the upper end portions of the control rod driving apparatuses and the cable connection terminals 242 for connecting to the cables. The seismic cap plates 240 for the control rod driving apparatuses horizontally transmit vibrations of the control rod driving apparatuses during the driving of the control rod driving apparatuses or the load applied to the control rod driving apparatuses during an earthquake to the seismic support ring beam 250.

The seismic support ring beam 250 transmits the load transmitted from the seismic cap plates 240 for the control rod driving apparatus to a hangar that is disposed on an external portion of the reactor head area assembly through the seismic support board 252.

A plurality of bolt holes 251 are disposed on the seismic support ring beam 250, and thus, the seismic support ring beam 250 can be detachably coupled to the upper shroud shell 110 using bolts that penetrate the openings formed on the flange 111 of the upper shroud shell 110.

Since the upper baffle 120 includes the flange and the openings, the upper baffle 120 can be coupled to the seismic support ring beam 250 using bolts. However, the upper baffle 120 simply provides the air path and does not support the load and is fixed on the upper shroud shell 110 while the upper shroud shell 110 supports the load, and thus, the upper baffle 120 can be coupled to the seismic ring beam 250 by being mounted on the seismic ring beam 250.

A height of the seismic ring beam 250 is equal to that of the seismic cap plates 240 for the control rod driving apparatuses, and the operating board 211 is also disposed at the same height.

In order to perform the operations relating to the control rod driving apparatus, the seismic cap plates 240 for the control rod driving apparatuses should be exposed. In addition, since the height of the seismic cap plate 240 for the control rod driving apparatuses and the height of the seismic ring beam 250 are equal to each other, the seismic support ring beam 250 and the upper shroud shell 110 and the upper baffle 120 in the upper module 100 can be coupled to each other. Also, since the seismic support ring beam 250 is a rigid structure, it is structurally stable that the upper shroud shell 110 and the upper baffle 120 of the upper module 100 are coupled to the seismic support ring beam 250.

The main columns 260 are directly connected to the reactor head 0 and penetrate the lower module 200 to be connected to the tripod 133. Referring to FIG. 9, the main columns 260 are rods that support the load applied to the reactor head area assembly when the entire reactor head area assembly is lifted when the upper module 100 and the lower module 200 are joined together. The main columns 260 remain in the lower module 200 as being fixed on the reactor head 0 when the upper module 100 is lifted.

Hereinafter, a process of separating the upper module 100 from the lower module 200 to perform the operations relating to the control rod driving apparatuses in a state where the upper module 100 and the lower module 200 are coupled to each other will be described with reference to FIG. 9.

In order to separate the upper module 100 and the lower module 200 from each other, the cables are first separated from the cable connection plate 113 through the cable bridge 114 that is formed on the outer portion of the upper shroud shell 110. In order to separate the cables from the cable connection terminals 242, the operator enters the upper shroud shell 110 through the door 112 formed in the upper shroud shell 110, and then, the operator disconnects the cables from the cable connection terminals 242.

When the cables are separated from the cable connection terminals 242, the coupling between the tripod 133 on the upper portion of the plenum 130 and the main columns 260 is released.

When the tripod 133 and the main columns 260 are separated from each other, the coupling between the upper baffle 120 and the seismic support ring beam 250 using the bolts is released in the upper shroud shell 110. If the upper baffle 120 is coupled to the seismic support ring beam 250 in the way that the flange of the upper baffle 120 is left on the seismic support ring beam 250, the bolts do not need to be removed.

After that, the coupling between the upper shroud shell 110 and the seismic support ring beam 250 using the bolts is released by an operator on the operating board 211. When the releasing operation is completed, the connections between the upper module 100 and the lower module 200 are disconnected and the upper and lower modules 100 and 200 can be separated from each other.

In this state, when a crane is connected to the shackle 132 and a lifting force is applied upward, the upper module 100 is removed, and the reactor head area assembly becomes the same as shown in FIG. 8. At this time, the main columns 260 maintain connection with the reactor head 0 as described above, and protrude from the seismic support ring beam 250.

Then, the operating space for performing the operations relating to the control rod driving apparatus are sufficiently ensured, and thus, the operator can operate stably.

In the above description, the seismic support ring beam is included in the lower module, and the upper module is detachably coupled to the seismic support ring beam. However, the structure of the reactor head area assembly is not limited thereto, that is, the seismic support ring beam can be included in the upper module and the lower module can be detachably coupled to the seismic support ring beam. In this case, the operations relating to the control rod driving apparatus also can be performed easily by exposing the seismic cap plate for the control rod driving apparatuses.

As described above, according to the present invention, the modular reactor head area assembly including a plurality of stacked modules is provided so that some parts of the reactor head area assembly can be removed or installed simultaneously. According to the present invention, the components of the reactor head area assembly can be removed using a simple disassembling process, and thus, the operator can easily perform maintenance of the control rod driving apparatuses that are located in the reactor head area assembly, and the moving and handling of the modular reactor head area assembly can be performed easily during the initial installation of the reactor head area assembly.

In addition, the modular reactor head area assembly is provided, and thus, the reactor head area assembly can be fabricated easily. Also, since the operations performed at the fabrication field can be minimized, the unity of the structure can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A modular reactor head area assembly installed on a reactor head, the modular reactor head area assembly comprising;
    a seismic support structure comprising a seismic cap plate that supports an upper portion of a control rod driving apparatus inserted thereinto, and a seismic support ring beam coupled to and surrounding an outer circumference surface of the seismic cap plate;
    an upper module that is an assembly of components located at an upper portion of the seismic support structure and comprises an upper shroud shell detachably coupled to the seismic support ring beam, a plenum disposed on an upper portion of the upper shroud shell, a cooling fan disposed on the plenum, a shackle coupled to the plenum, and a tripod coupled to the shackle;
    a lower module that is an assembly of components located at a lower portion of the seismic support structure and of which an upper portion is coupled to the seismic support structure; and
    a main column accommodated in the upper module and lower module, and of which a first end is detachably coupled to the reactor head and a second end is detachably coupled to the tripod.

2. The modular reactor head area assembly of claim 1, wherein the upper module comprises:
    an upper baffle that is disposed in the upper shroud shell, forms an air path along with the upper shroud shell, and is coupled to the seismic support ring beam.

3. The modular reactor head area assembly of claim 1, wherein the lower module comprises:
    a lower shroud shell formed as a cylinder with open upper and lower ends;
    a lower baffle disposed in the lower shroud shell and forming an air path along with lower shroud shell; and
    a plurality of control rod driving apparatuses coupled to the reactor head.

4. The modular reactor head area assembly of claim 1, wherein a flange is disposed on a lower end portion of the upper shroud shell to protrude outwards, and is coupled to the seismic support ring beam via a bolt.

5. The modular reactor head area assembly of claim 1, further comprising:
    a cable support ring beam coupled to an external side of the upper shroud shell; and
    a plurality of cable support wires coupled to the cable support ring beam, wherein a first end of each of the cable support wires is coupled to the cable support ring beam, and a second end is coupled to the cable support ring beam through the upper shroud shell.

6. The modular reactor head area assembly of claim 1, further comprising a cable connection plate disposed on an external side of the upper shroud shell and coupled to a cable extending from the control rod driving apparatus.

* * * * *

UNITED STATES PATENT AND TRADEMARK OFFICE
CERTIFICATE OF CORRECTION

| | | |
|---|---|---|
| PATENT NO. | : 8,599,989 B2 | Page 1 of 1 |
| APPLICATION NO. | : 12/521911 | |
| DATED | : December 3, 2013 | |
| INVENTOR(S) | : Kang et al. | |

It is certified that error appears in the above-identified patent and that said Letters Patent is hereby corrected as shown below:

On the Title Page, please change the Assignee information from:

(73) Assignee: Korea Power Engineering Company, Inc., Yongin (KR)

to read as follows:

(73) Assignee: Kepco Engineering & Construction Company, Inc., Yongin (KR)

Signed and Sealed this
Sixth Day of January, 2015

Michelle K. Lee
*Deputy Director of the United States Patent and Trademark Office*